United States Patent
Barich et al.

(10) Patent No.: US 6,597,973 B1
(45) Date of Patent: Jul. 22, 2003

(54) METHOD AND ARRANGEMENT FOR INSPECTION AND REQUALIFICATION OF LINED VEHICLES USED FOR TRANSPORTING COMMODITIES AND/OR HAZARDOUS MATERIALS

(76) Inventors: Daniel M. Barich, 20527 S. Timber Mill Dr., Frankfort, IL (US) 60423; Timothy Donahue, 2012 Dorset Dr., Wheaton, IL (US) 60187; Michael Yeung, 400 S. Green St., #401, Chicago, IL (US) 60607

( * ) Notice: Subject to any disclaimer, the term of this patent is extended or adjusted under 35 U.S.C. 154(b) by 0 days.

(21) Appl. No.: 09/672,099

(22) Filed: Sep. 29, 2000

Related U.S. Application Data

(60) Provisional application No. 60/157,055, filed on Oct. 1, 1999.

(51) Int. Cl.[7] .......................... G06F 19/00; G01M 19/00
(52) U.S. Cl. .......................................... 701/29; 73/118.1
(58) Field of Search ............................. 701/29–30, 33, 701/35, 36, 45; 33/562–563, 565–567; 705/400, 404, 1, 20; 702/33–36, 182–185, 155–158; 73/118.1

(56) References Cited

U.S. PATENT DOCUMENTS

| | | | |
|---|---|---|---|
| 4,247,757 A | 1/1981 | Crump, Jr. | |
| 4,368,644 A | 1/1983 | Wentzell et al. | |
| 4,490,833 A | 12/1984 | Inomata et al. | |
| 4,658,649 A | 4/1987 | Brook | |
| 4,709,383 A | * 11/1987 | Goto et al. ................... | 378/72 |
| 5,008,661 A | 4/1991 | Raj | |
| 5,036,707 A | 8/1991 | Paciej et al. | |
| 5,256,966 A | 10/1993 | Edwards | |
| 5,619,423 A | 4/1997 | Scrantz | |
| 5,631,831 A | 5/1997 | Bird et al. | |

(List continued on next page.)

OTHER PUBLICATIONS

International Search Report dated Jan. 8, 2001.
International Search Report dated Jan. 29, 2001.
Appendix B to DOT–E 12095 "Alternative Tank Car Qualification Program", pp. 1–12.
Appendix R, AAR Manual of Standards and Remcommended Practices, Specifications for Tank Cars, pp. 319–331.
AAR Memo dated Apr. 5, 1999, Casualty Prevention Circular, "New Requirements for Inspections of Stub Sills on Tank Cars", CPC–1094.
AAR Memo dated Nov. 15, 1999, Casualty Prevention Circular, "Inspections of Stub Sills on Tank Cars–Availability of SILSPEC3 Software and Correction to Form SS–3", CPC–1100.
AAR Memo dated Aug. 10, 1994, O&M Circular No. 1, Supplement No. 2, "Tank Car Stub Sill Inspection Program", CPC–1030.
AAR Memo dated Jun. 10, 1995, O&M Circular No. 1, Supplement No. 3, Tank Car Stub Sill Inspection Program, CPC–1047.

(List continued on next page.)

*Primary Examiner*—Thu Nguyen
(74) *Attorney, Agent, or Firm*—McDermott, Will & Emery

(57) ABSTRACT

A test procedure for inspecting a vehicle adapted to transport commodities. This procedure includes the steps of inspecting a lining disposed in a tank of a tank car and comparing crack, blister, and corrosion conditions on the liner with predetermined models. These predetermined models convey a discrete range of severity levels of cracks, blisters, and corrosion conditions and permit determination of a severity level for the compared condition(s). The severity level for the condition is then documented. Standardization of inspection findings facilitates trending analysis of each tank car or vessel lining to determine when requalification of a given lining should be carried out, thus improving the safety with which commodities (including regulated hazardous materials) are shipped and stored.

16 Claims, 12 Drawing Sheets

U.S. PATENT DOCUMENTS

| | | | |
|---|---|---|---|
| 5,648,619 A | | 7/1997 | Gustafsson et al. |
| 5,664,112 A | * | 9/1997 | Sturgeon et al. ............... 705/28 |
| 5,717,595 A | * | 2/1998 | Cherrington et al. ....... 705/400 |
| 5,724,133 A | * | 3/1998 | Meadows et al. ........ 356/241.1 |
| 5,956,077 A | | 9/1999 | Qureshi et al. |
| 5,964,811 A | | 10/1999 | Ishii et al. |
| 6,047,241 A | * | 4/2000 | Sparago ...................... 376/305 |
| 6,052,631 A | | 4/2000 | Busch et al. |
| 6,070,111 A | | 5/2000 | Takakura et al. |
| 6,101,433 A | | 8/2000 | Flicker, Jr. |
| 6,219,930 B1 | * | 4/2001 | Reid .......................... 33/562 |

OTHER PUBLICATIONS

AAR Memo dated Oct. 18, 1996, Casualty Prevention Circular, "Tank Cars Manufactured to the RIC–RIC Stub Sill Design", CPC–1070.

AAR Memo dated Dec. 5, 1996, Casualty Prevention Circular, "Tank Cars Manufactured to the RIC–RIC Stub Sill Design", CPC–1072.

AAR Memo dated Jun. 6, 1997, Casualty Prevention Circular, Requirements for Tank Car Owners to Perform Stub Sill Damage Tolerance Analyses, CPC–1082.

EO–17, FRA Order No. 17, Notices 1 and 2, "Owners of Railroad Tank Cars".

AAR Memo dated Jun. 17, 1992, O&M Circular No. 1, "Tank Car Stub Sill Inspection Program".

49 Code of Federal Regulations, Subpart F Sec. 180.501–509.

49 Code of Federal Regulations, Sec. 179.100–6, 179.101–1, 179.100–7 (d).

Rule 88—Interchange of Freight Cars, "Mechanical Requirements For Acceptance", pp. 518–532.

AAR Memo dated Sep. 7, 1999, Casualty Prevention Circular, "New Requirements for Inspections of Stub Sills on Tank Cars", CPC–1097.

* cited by examiner

*Figure 6a*

TABLE 1: Accept/Repair Disposition

| Defect | Condition | P.P | Commodity Corrosiveness | | | |
|---|---|---|---|---|---|---|
| | | | 6 | 4 | 3 | 2 |
| Cracks | 8 | R | R | A | A | A |
| | 6 | R | R | R | A | A |
| | 4 | R | R | R | R | R |
| Blisters | 8 | R | A | A | A | A |
| | 6 | R | A | A | A | A |
| | 4 | R | R | A | A | A |
| | 2 | R | R | R | R | A |
| Corrosion | RE1 | R | R | R | A | A |
| | RE2 | R | R | R | A | A |
| | RE3 | R | R | R | A | A |

A = Accept as is disposition
R = Repair disposition

Figure 6b    Lining System Operating Characteristics

| Lining System | approx. dft | Properties | Recommended Service | Failure Criteria | Estimated Life |
|---|---|---|---|---|---|
| (Unmodified) High Bake Phenolic (400°F) | 8 to 10 mils in multiple coats | Very good Water Resistance Good Corrosion Resistance High Temperature Resistant Difficult to repair or to touch-up | Organic and Inorganic Acids (concentrated and diluted) Less suitable for strong Alkalis Resistant against most Solvents Can be used for Food Grade Chemicals | Cracking due to mechanical impact (direct or reverse), temperature cycling or vibration. Hydrogen grooving of steel under coating in highly concentrated sulfuric acid. | 8 years |
| (Modified) High Bake Phenolic (400°F) | 8 to 10 mils in multiple coats | Very good Water Resistance Good Corrosion Resistance Less brittle than unmodified phenolics | Diluted Organic and Inorganic Acids Good resistance against strong Alkalis Can be used for Food Grade Chemicals Resistant to most Solvents | Cracking due to mechanical impact (direct or reverse), temperature cycling or vibration. | 8 years |
| (Modified) High Bake Epoxy/Amine (400°F) | 12 to 15 mils in 2 coats | Very good Water Resistance Good Corrosion Resistance Two-pack materials | Diluted Organic and Inorganic Acids Very good resistance against hot alkalis Good Solvent Resistance | Becomes brittle on aging. May blister in unsuitable chemicals. May crack under impact and bending. | 7 years |
| (Modified) Low Bake Epoxy/Amine (250°F) | 12 to 15 mils in 2 coats | Good Water Resistance Good Corrosion Resistance Two-pack materials | Diluted, non oxidizing Inorganic Acids Very good resistance against hot alkalis Good Solvent Resistance | Becomes brittle on aging. May blister and/or soften in certain chemicals. May crack under impact and bending. | 7 years |
| Epoxy/Phenolic/Amine air-dry or force curing | 12 to 15 mils | Good Water Resistance Good Corrosion Resistance Two-pack materials | Acidity not lower than pH 2 Very good Alkali Resistance Good Solvent Resistance | Becomes brittle on aging. May blister and/or soften in certain chemicals. May crack under impact and bending | 7 years |
| Epoxy/Amine Solvent Free. Air dry of Force Curing (*) | 12 to 15 mils in 1 coat | Good Water Resistance Good Corrosion Resistance Plural Component Appl. | Diluted, non oxidizing Inorganic Acids Very good resistance against Alkalis Good Solvent Resistance | Becomes slightly brittle with aging. May slightly soften in certain solvents. Better Crack and Impact Resistant | 8 years |
| Epoxy/Polyamidoamine Force curing | 10 - 14 mils 2 coats | Good Water Resistance Good Corrosion Resistance Two-pack materials | Good resistance against diluted alkalis Resistant against some solvents Can be Food Grade Compliant | Becomes slightly brittle with aging. May blister or soften in certain solvents Fair Crack and Impact Resistant. | 6 years |
| Rubber Sheet Lining | N/A | Application using in-situ vulcanizing and adhesives. | Good Acid and Alkali Resistance Not suitable for most Solvents Maximum Temperature 150°F Hard rubber better resistant than soft rubber | Oxidizing chemicals may attack the sheet lining and embrittle. Sheets may loose adhesion. Welds may deteriorate (corrosion) | 12 years |

Figure 7

TABLE 2: Lining Condition Matrix

| Complete Extended Life Cycle | Defect Type | Lining Condition | | | |
|---|---|---|---|---|---|
| | | Excellent A | Good B | Fair C | Poor D |
| 0 - 25% | Crack<br>Blister<br>Corrosion<br>DFT<br>Stains | No Defects<br>No Defects<br>No Defects<br>> 8 mils<br>No Spots | No Defects<br>> No. 8(2.5%)<br>No Defects<br>> 7 mils<br>No Spots | > No. 8<br>> No. 6(15%)<br>> Re 1<br>> 6 mils<br>< 10 Sq. Ft | > No. 6<br>> No. 6(45%)<br>> Re 2<br>< 6 mils<br>> 10 Sq. Ft |
| 26 - 42% | Crack<br>Blister<br>Corrosion<br>DFT<br>Stains | No Defects<br>No. 6(2.5%)<br>No Defects<br>> 7 mils<br>No Spots | No Defects<br>> No. 6(15%)<br>No Defects<br>> 7 mils<br>No Spots | > No. 8<br>> No. 4(45%)<br>> Re 2<br>> 6 mils<br>< 20 Sq. Ft | > No. 6<br>> No. 2(15%)<br>> Re 2<br>< 6 mils<br>> 20 Sq. Ft |
| 43 - 58% | Crack<br>Blister<br>Corrosion<br>DFT<br>Stains | No Defects<br>> No. 6(2.5%)<br>No Defects<br>> 6 mils<br>No Spots | No Defects<br>> No. 6(15%)<br>No Defects<br>> 5 mils<br><10 Sq. Ft | > No. 8<br>> No. 4(15%)<br>< Re 2<br>< 5 mils<br>< 20 Sq. Ft | > No. 4<br>> No. 4(15%)<br>< Re 2<br>< 5 mils<br>> 20 Sq. Ft |
| 59 - 83% | Crack<br>Blister<br>Corrosion<br>DFT<br>Stains | No Defects<br>No. 6(15%)<br>No Defects<br>> 5 mils<br>< 10 sq. Ft | No Defects<br>> No. 4(15%)<br>No Defects<br>> 5 mils<br>< 10 Sq. Ft | > No. 6<br>> No. 2(15%)<br>< Re 2<br>> 5 mils<br>< 20 Sq. Ft | > No. 4<br>> No. 2(45%)<br>< Re 2<br>< 5 mils<br>> 20 Sq. Ft |
| > 83% | Crack<br>Blister<br>Corrosion<br>DFT<br>Stains | No Defects<br>No. 4(15%)<br>No Defects<br>> 5 mils<br>< 10 sq. Ft | No Defects<br>> No. 4(15%)<br>No Defects<br>> 5 mils<br>< 10 Sq. Ft | > No. 4<br>> No. 4(15%)<br>< Re 2<br>> 5 mils<br>< 20 Sq. Ft | > No. 4<br>> No. 4(15%)<br>< Re 3<br>< 5 mils<br>> 20 Sq. Ft |

Figure 8

Work Instruction:

1. Blistering

A phenomenon peculiar to painted surfaces is the formation of blisters relative to some system weakness. This procedure describes the procedure for determining the size and density of the blisters so that comparisons can be made.

Procedure

Inspect the lining surface for evidence of blistering. Match the visual standards with the actual condition of the lining to determine the size and frequency of the blistering.

Size – There are 5 degrees of size on a numerical scale.

Number 10 – no blistering

Number 8 – smallest blister easily seen by eye

Number 6 – Small blistering

Number 4 – Medium blistering

Number 2 – Large blistering

Frequency – There are 3 degrees of frequency for each category of size which describe the density of the number of blisters formed in a local area Code MD - Medium Dense Code M - Medium Code F- Few

Reporting:
Record the size of the largest area of damage. This will be a No. code.
Record the density of the largest area of damage. This will be a letter code.
Indicate weather the Blistering is scattered or localized
If it is localized indicate the number of areas

Sketch/Description:

- 2,5% BLISTERS COVER TOTAL AREA — FEW
- 15% BLISTERS COVER TOTAL AREA — MEDIUM
- 45% BLISTERS COVER TOTAL AREA — MEDIUM DENSE

Blister size No 8 (810) · Blister size No 6 (820) · Blister size No 4 (830) · Blister size No 2 (840)

Work Instruction:

2. Cracking

Cracking is a condition that occurs when there is a break in the film surface that extends to the substrate. Where this is difficult to determine the break should be evaluated with a minimum of 10X magnification and only be called a crack if the underlying surface is visible.

Procedure

Visually compare the surface with the photographic reference standards to determine the size and density of the cracking.

Three categories of cracking:

Code I - Irregular Pattern Type – Cracking, in which the breaks in the film are in no definite pattern.

Code L - Line Type – Cracking in which the breaks in the film are generally arranged in parallel lines, usually horizontally or vertically over the surface.

Code S - Sigmoid Type – Cracking in which the breaks in the film form a pattern consisting of curves meeting and intersecting usually on a large scale. See adjacent Visual Standards Since the type and degree of failure may vary over any given area, a representative portion should be rated.

Reporting:
Record the combination size and density of the largest area of damage. This will be a No. Code.
Record the type of cracking. This will be a letter code.
Indicate weather the cracking is scattered or localized
If it is localized indicate the number of areas

Sketch/Description:

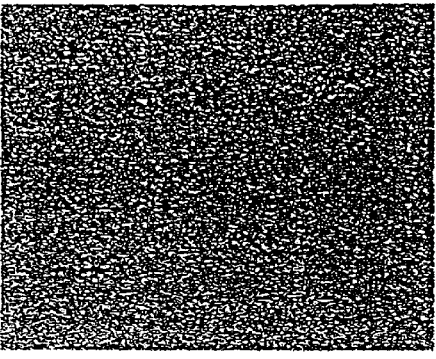
No. 6

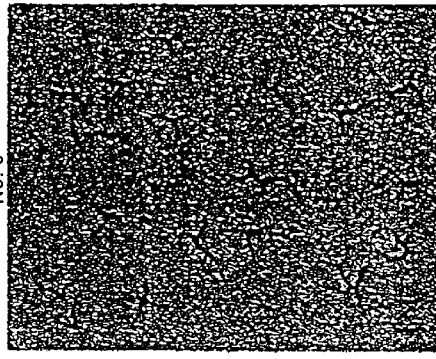
No. 2

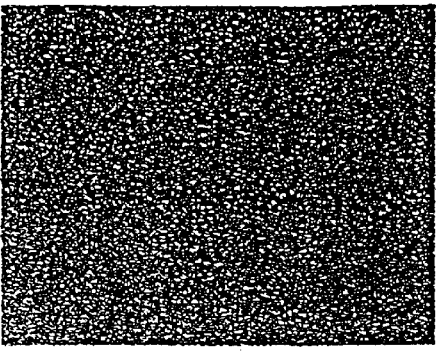
No. 8

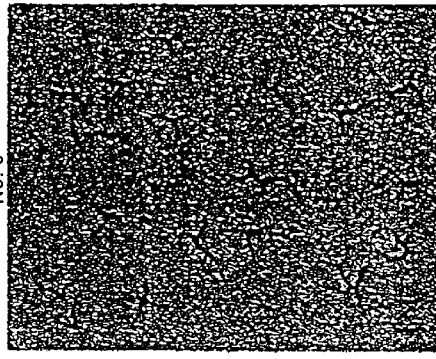
No. 4

Figure 10

Work Instruction:

3. Corrosion

This test method covers the evaluation of the degree of rusting on painted steel surfaces using visual standards. The amount of rusting beneath or through a paint film is a significant factor in determining weather a coating system should be repaired or replaced.

Procedure

Visually compare the surface with the photographic reference standards to determine the scale of degree of rusting.

Corrosion may be scattered or localized

Be careful not confuse dirt or staining from rust with actual rusting.

Re 1 - smallest corrosion easily seen by eye

Re 2 - small amounts of corrosion

Re 3 - Medium amounts of corrosion

Re 4 - large amounts of corrosion

Reporting:
Record the combination scale of degree of rusting and the density of the largest area of damage. This will be a Re code.
Indicate weather the rusting is scattered or localized
If it is localized indicate the number of areas

Sketch/Description:

| Scattered | Localized |
|---|---|
| Re 1 | A  0.05% |
| Re 2 | B  0.5% |
| Re 3 | C  1% |
| Re 4 | D  3% |

METHOD AND ARRANGEMENT FOR INSPECTION AND REQUALIFICATION OF LINED VEHICLES USED FOR TRANSPORTING COMMODITIES AND/OR HAZARDOUS MATERIALS

CROSS-REFERENCE TO PROVISIONAL APPLICATION

This application claims priority from U.S. provisional patent application Ser. No. 60/157,055 filed Oct. 1, 1999, the entire disclosure of which is incorporated herein by reference.

BACKGROUND OF THE INVENTION

1. Field of the Invention

The invention relates generally to safety inspections and requalification of transport arrangements. More specifically, the invention relates to a method and arrangement for the inspection and requalification of tank cars and the like type of cargo-carrying vehicles adapted to transport commodities including regulated and un-regulated materials.

2. Description of the Related Art

In order to improve the level of safety and security with which hazardous materials, as defined by the U.S. Department of Transportation (DOT) can be transported from one place to another, it has been proposed to increase the requirements for the qualification and maintenance of tank cars which are used to transport such materials along the rail systems of the country. These requirements, while initially appearing to cover essentially all aspects of the inspection process, still leave many stones unturned. For example, even though the Department of Transportation has set forth requirements specifying the types of tests which are deemed necessary for tank car carrying regulated commodities (i.e. as set forth in 49 C.F.R §§180.501–180.519), the actual manner in which the tests are to be carried out has not been defined in terms sufficiently specific to detail just what type of tests are required, how these tests need to be actually carried out to ensure that all of the features and structures which tend to be at high risk, are examined in a proper manner and how data derived from these tests should be evaluated and interpreted.

In other words, a worker skilled in the art of inspecting tank cars, even with many years of experience, would need guidance as to the totality of parameters to test, such as the number of sites to examine or the equipment or tests to be implemented, as well as acceptance criteria conservatively correlating the conditions observed during the inspection to an acceptable operating condition at the end of an inspection cycle term. For example, conventional testing methodology such as hydrostatic testing detects only through-wall cracks and some tanks actually fail shortly after being hydro-tested. Further, it has been found that the inspection cycle which is used in connection with the inspections has not been developed with any consideration as to the actual risk of failure, and the data which is gleaned from even relatively detailed inspection is not used/analyzed in a manner which would lead toward tank car safety.

This shortcoming is evident in the regulatory guidance provided for the inspection of linings and coatings of rail cars. Generally, linings are sheets of material, such as laminated material, glass, or fused metal, applied to the interior of a tank car to act as a barrier between the base metal and the commodity. Coatings are any paint type protective covering applied in one or more coats to the interior of a tank car to act as a barrier between the base metal and the commodity.

Appendix B to DOT-E 12095, §180.509(i)(Nov. 16, 1998 version), Alternative Tank Car Requalification Program, provides a listing in Attachment A of materials considered corrosive to carbon steel tanks or service equipment including for example, various types of acids, such as hydrochloric acids and sulfuric acids.

For example, 49 C.F.R §180.509(Oct. 1, 1999 edition) states:

(i) Lining and coating inspection and test. When this subchapter requires a lining or coating, at a minimum, each tank car facility must inspect the lining or coating installed on the tank car according to the inspection interval [sic: interval,] test technique, and acceptance criteria established by the owner of the lining or coating in accordance with paragraph (c)(3)(iii) of this section.

Similarly, 49 C.F.R §180.509(c)(iii)(A)(Oct. 1, 1999 edition) states, in part:

(A) When a lining or coating is applied to protect the tank shell from the lading, the owner of the lining or coating shall determine the periodic inspection interval, test technique, and acceptance criteria for the lining or coating.

Likewise, the Alternative Tank Car Requalification Program, Appendix B to DOT-E 12095, §180.509(i)(Nov. 16, 1998 version), states in part:

(1) Each lining or coating owner shall ensure for the qualification of a lining or coating used to protect the tank from a material listed in Attachment A of this alternative program (i.e., materials corrosive to the tank). The owner of the lining or coating shall establish and maintain a record of the service life of the lining or coating and commodity combination. Before Jul. 1, 2006, the owner of the lining shall use their knowledge of the lining or coating and commodity pairing to establish an appropriate inspection interval. After Jul. 1, 2006, the owner of the lining shall use the information in these records to determine the appropriate inspection interval for each lining or coating and commodity pairing . . .

(2) The owner of the lining or coating shall provide the test method and acceptance criteria for the lining or coating to the tank car owner and to the person responsible for qualifying the method or coating.

There is, accordingly, a need for a systematic method to compile, analyze, and record information regarding a tank car lining or coating and service environment in a form which will enable the condition of the tank car lining or coating status inspected to be tracked over a period of time to permit an accurate estimation of lining or coating condition at any given time. It is therefore evident that there is a need for some form of highly detailed instructions sufficient to enable those skilled in the art to perform an inspection of the tank car lining or coating is required.

SUMMARY OF THE INVENTION

The invention enhances the use, lease or sale of the units, with a high degree of confidence by providing a method of inspecting DOT specification tank cars, American Association of Rail ("AAR") regulated tank cars and like type vehicles which are used to transport commodities including both regulated (e.g. hazardous) and un-regulated materials that, at the very least, meets and/or exceeds currently imposed federal government standards and provides a level of certainty with respect features and structures that tend to be at high risk.

As will be appreciated from the preceding and following disclosure, a first aspect of this invention resides in a test procedure for inspecting a vehicle adapted to transport commodities. This test procedure includes steps of inspecting a lining disposed in a tank of a tank car and comparing at least one of cracks, blisters, and corrosion conditions on the liner with predetermined models, wherein the predetermined models convey a discrete range of severity levels of the cracks, blisters, and corrosion conditions. Based on this comparison, a severity level for such compared condition(s) are determined and recorded. In an aspect thereof are also included the steps of cross-referencing the compared condition severity level with indices indicative of the corrosiveness of a commodity to be transported in the tank to determine if lining repair is required, wherein the indices indicate a repair disposition if any one of the cracks, blisters, and corrosion exceeds a predetermined minimum threshold for a specified commodity corrosiveness. Accordingly, an accept or repair disposition to the lining is assigned.

In another aspect thereof, following inspection of the lining and determination and recording of a severity level for each of the compared conditions, a percentage of lining complete extended life cycle for a lining inspected may be determined and may be used to equate the combined defect severity level of a plurality of the compared conditions to one of a plurality of discrete lining condition values. The combined defect severity level may include a combination of any of the defect conditions, such as cracking and corrosion.

Still another aspect of the invention includes a method of standardizing a test procedure for inspecting a vessel adapted to contain commodities, including defining at least one defect type, defining a plurality of defect severities within the defect type, and generating a model of each of the defect severities within the defect type. Each of these models is then correlated to a corrosiveness of a transported commodity to determine a repair disposition of the lining in relation to the models. In an aspect thereof, additional steps of defining a plurality of defect types including at least two members selected from the group of cracks, blisters, corrosion, dry film thickness, and discoloration and defining a plurality of defect severities within each of the plurality of defect types are performed. A model of each of the defect severities within each of the plurality of defect types is generated and each of plurality of defect types is correlated to a corrosiveness of a transported commodity to determine a repair disposition of the lining in relation to the models.

Additional features and advantages of the invention will become readily apparent to those skilled in the art from the following detailed description, wherein only several embodiments or applications of the invention are shown and described, simply by way of illustration of modes contemplated for carrying out the invention. As will be realized, the invention is capable of other and different embodiments, and its several details are capable of modifications in various obvious respects, all without departing from the invention. Accordingly, the drawings and description are illustrative in nature and are not limiting.

BRIEF DESCRIPTION OF THE DRAWINGS

The various features and advantages of the present invention will become more clearly appreciated as a detailed description of a preferred embodiment is given with reference to the appended drawings, wherein:

FIG. 6a is a table showing lining system operating characteristics.

FIG. 6b is a table showing a liner condition acceptability matrix in accord with the invention.

FIG. 7 shows a table used to assign a liner condition value in accord with a remaining life of the tank and inspection results.

FIG. 8 shows models generated in accord with the invention for a blistering defect condition.

FIG. 9 shows models generated in accord with the invention for a cracking defect condition.

FIG. 10 shows models generated in accord with the invention for a corrosion defect condition.

DETAILED DESCRIPTION OF THE PREFERRED EMBODIMENTS

Figure 1:
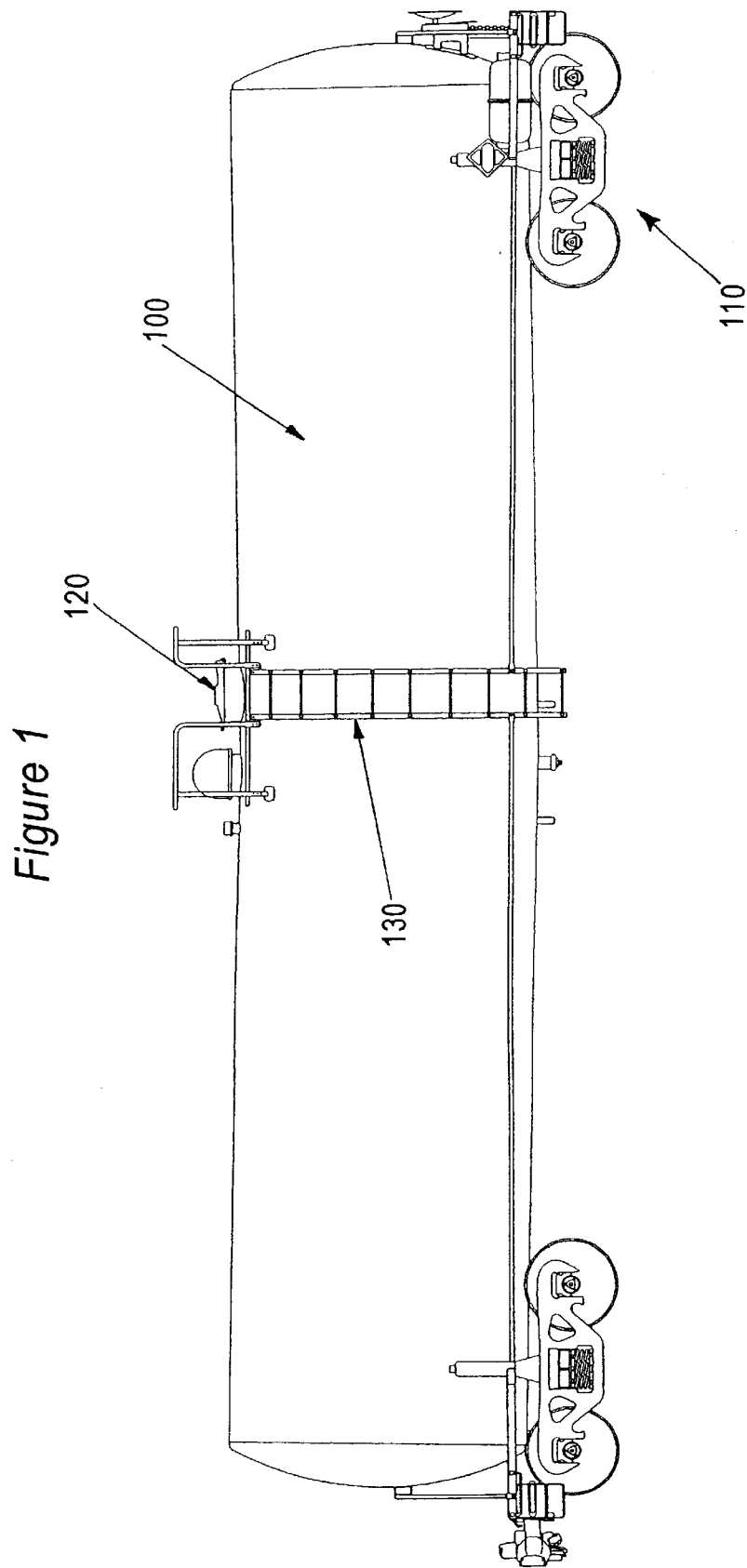
FIG. 1 is a side view showing a typical tank car configuration.

FIG. 1 depicts a typical tank car which is subjected to examination and requalification according to the present invention. As shown this vehicle, which is used to transport commodities, consists basically of a tank structure 100 and wheeled carriages 110 connected to the underside thereof. It should be noted that, irrespective of the type of tank car which is involved, the tank per se is invariably a self-contained structure sufficiently rigid/strong to support not only its own weight but the weight of the cargo which is introduced into the tank. The understructure includes two or more wheeled carriage members or bogies 110 secured to the tank, such as by connectors or by the weight of the tank itself, to complete the basic unit. While various other conventional structures such as a hatch 120, ladder 130, etc., are illustrated, these elements will for brevity not be discussed.

Figure 2:
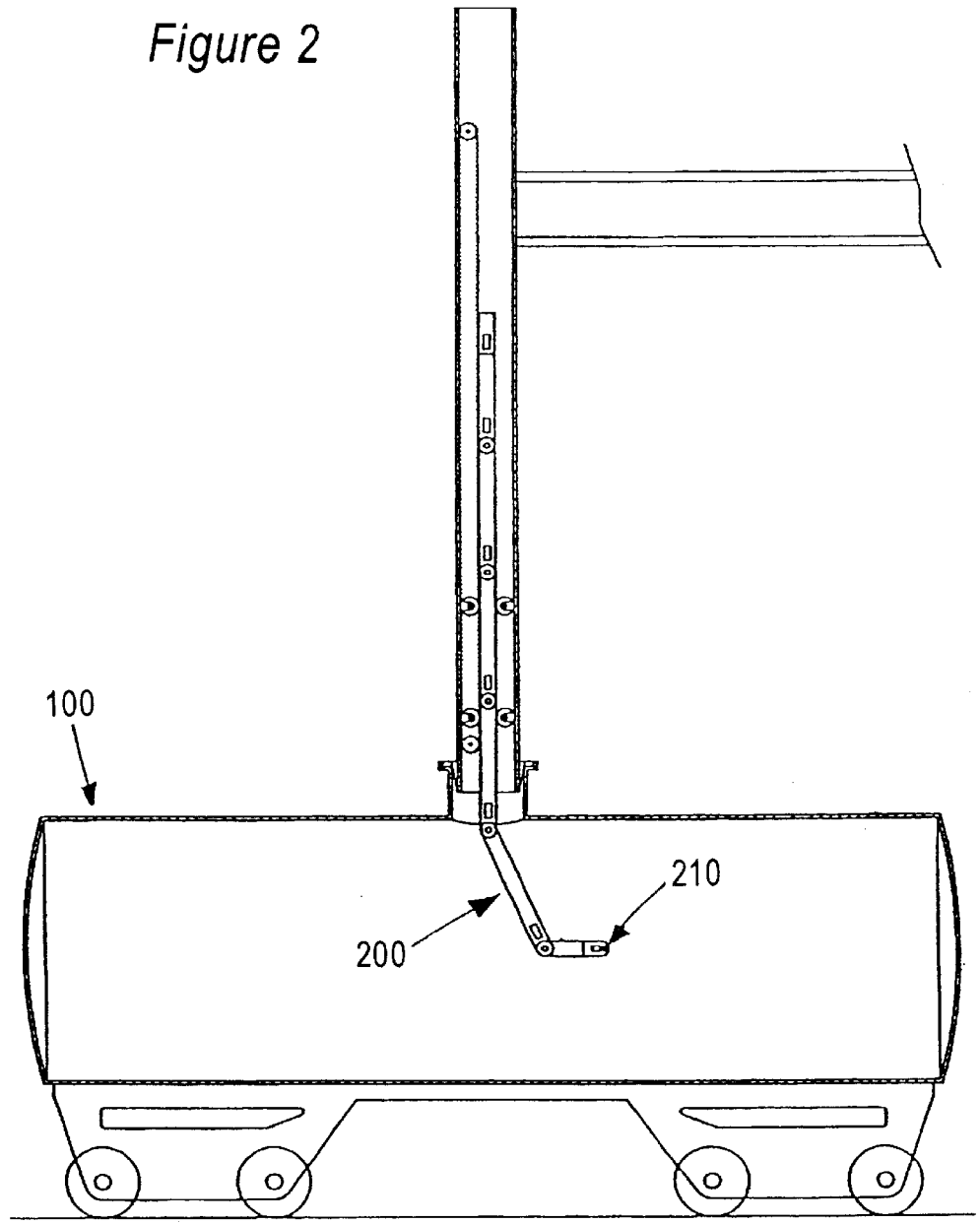
FIG. 2 is a schematic representation of a tank car being inspected robotically using an arrangement which could be used with the present invention in order to assist in inspecting/measuring the interior of a cylindrical vessel that forms a vital part of the tank car structure.
Figure 3:
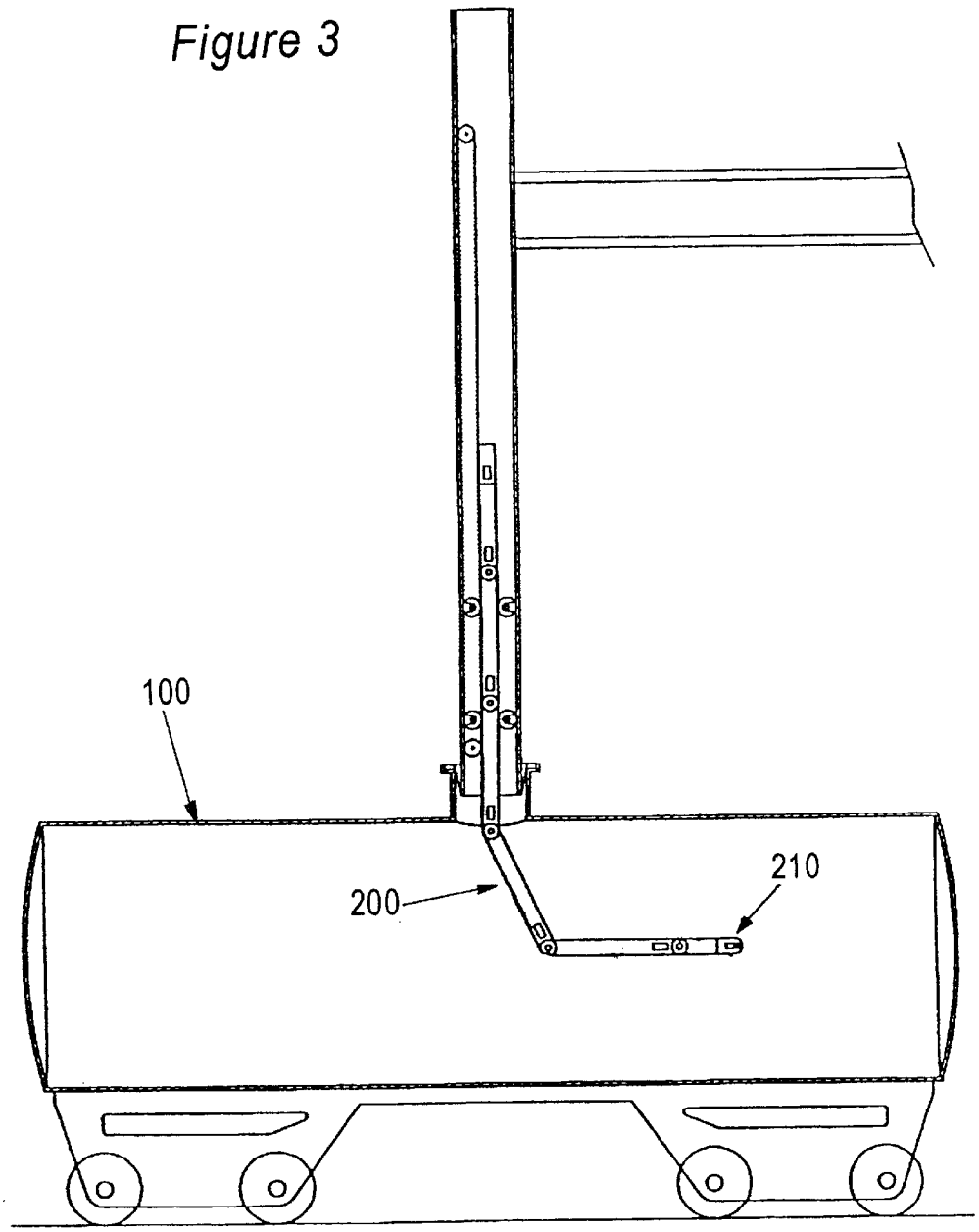
FIG. 3 is a further schematic view of the arrangement shown in FIG. 1, showing the manner in which the robotic arm can extend and bend about one or more of a plurality of joints and reach into the nooks and crannies of the interior of a tank.

FIGS. 2 and 3 schematically depict a tank car being inspected robotically via an arrangement which provided in U.S. Pat. No. 5,956,077 issued on Sep. 21, 1999 to Qureshi et al., hereby incorporated by reference. As shown, the tip of the snake-like probe 200 is provided with a sensor 210. Sensor 210 can, for the purposes of the present invention, take the form of an ultrasonic sensor or any other form of non-destructive sensing arrangement. Alternatively and/or in addition to the sensor, the tip can be provided with a camera and powerful illumination means for facilitating tank interior inspection. This type of arrangement has merit in the instances that the tank has not been cleaned out to the degree that it is safe for a person or persons to physically enter the tank and perform the required inspections, tests and data recordation. Non-limiting examples of sensor types and configurations compatible with the present invention are provided in U.S. Pat. No. 5,256,966 issued on Oct. 26, 1993;

U.S. Pat. No. 5,036,707 issued on Aug. 6, 1991 to Paciej et al.; U.S. Pat. No. 4,368,644 issued on Jan. 18, 1983 to Wentzell et al.; U.S. Pat. No. 4,658,649 issued on Apr. 21, 1987; U.S. Pat. No. 5,648,619 issued to Gustafsson et al. on Jul. 15, 1997; U.S. Pat. No. 4,490,833 issued to Inomata et al. on Dec. 25, 1984; or U.S. Pat. No. 5,619,423 issued on Apr. 8, 1997 to Scrantz. The respective content of these references inasmuch as it is relevant to use with the present invention is hereby incorporated by reference.

It is to be noted, however, that these arrangements are only exemplary of devices/arrangements which can be used to inspect, repair both the interior and the exterior of the tanks and associated structural components, such as under frame, carriage, or wheels. It is to be further noted that these arrangements are only ancillary with respect to the crux of the invention which is seen as residing in the procedures and requirements set forth below. These procedures and requirements, although augmentable by sensors for various reasons including the safety of those implementing the procedure, do not necessarily require sensors and may equally be accomplished visually in conformance with applicable regulations, such as Occupational Safety and Health Administration (OSHA) regulations, governing visual inspection of hazardous containers or "closed containers".

In accord with the method herein, there is laid out a systematic process to gather and record information suitable for short-term operability determinations, such as a pass/fail test, as well as long-term trending and analysis. This is accomplished, generally, by correlating observed defects to predetermined models, which are in turn correlated to other parameters of interest to determine a lining condition and to set an appropriate inspection period for a subsequent lining inspection. Such correlation is advantageously effected by means of an indices or matrices setting forth the relations between, for example, observed defect conditions on one axis, a parameter of interest on another axis, and the condition to be determined within the data field (e.g., lining acceptance/rejection disposition). This data format provides rapid identification of the appropriate inspection period or repair indication, but is not limited in structure or concept thereto. Examples of preferred matrices are shown in FIGS. 6a and 7.

Prior to execution of the method of inspection in accord with the invention, a plurality of defect inspection categories must be determined and defined. Thus, by way of background and clarity, a variety of defect conditions to be inspected will first be discussed. These defect conditions include, for example, cracks, blisters, and corrosion. Cracking, as shown for example in FIG. 9, is a condition that occurs when there is a break in the lining or coating surface that extends to the substrate along at least a portion thereof when view under a magnification of less than about 10×. Blistering is illustrated in FIG. 8 and is a defect peculiar to painted or coated surfaces and is manifested as groupings of blisters or bubbles under the surface of the outer layer of paint or coating. Corrosion, shown in FIG. 10, is generally a result of chemical interaction between the lining material, coating material, and/or substrate with other chemicals or elements present in the environment, such as the interaction of carbon steel, oxygen, and water to generate rust. The inspection may also include inspection for dry film thickness (DFT). For a given application, it is conservatively desired to maintain a minimum dry film thickness. The dry film thickness may be inaccurately applied, resulting in thickness variations, or the film thickness may be chemically or mechanically abraded over time by various means.

Figure 4:
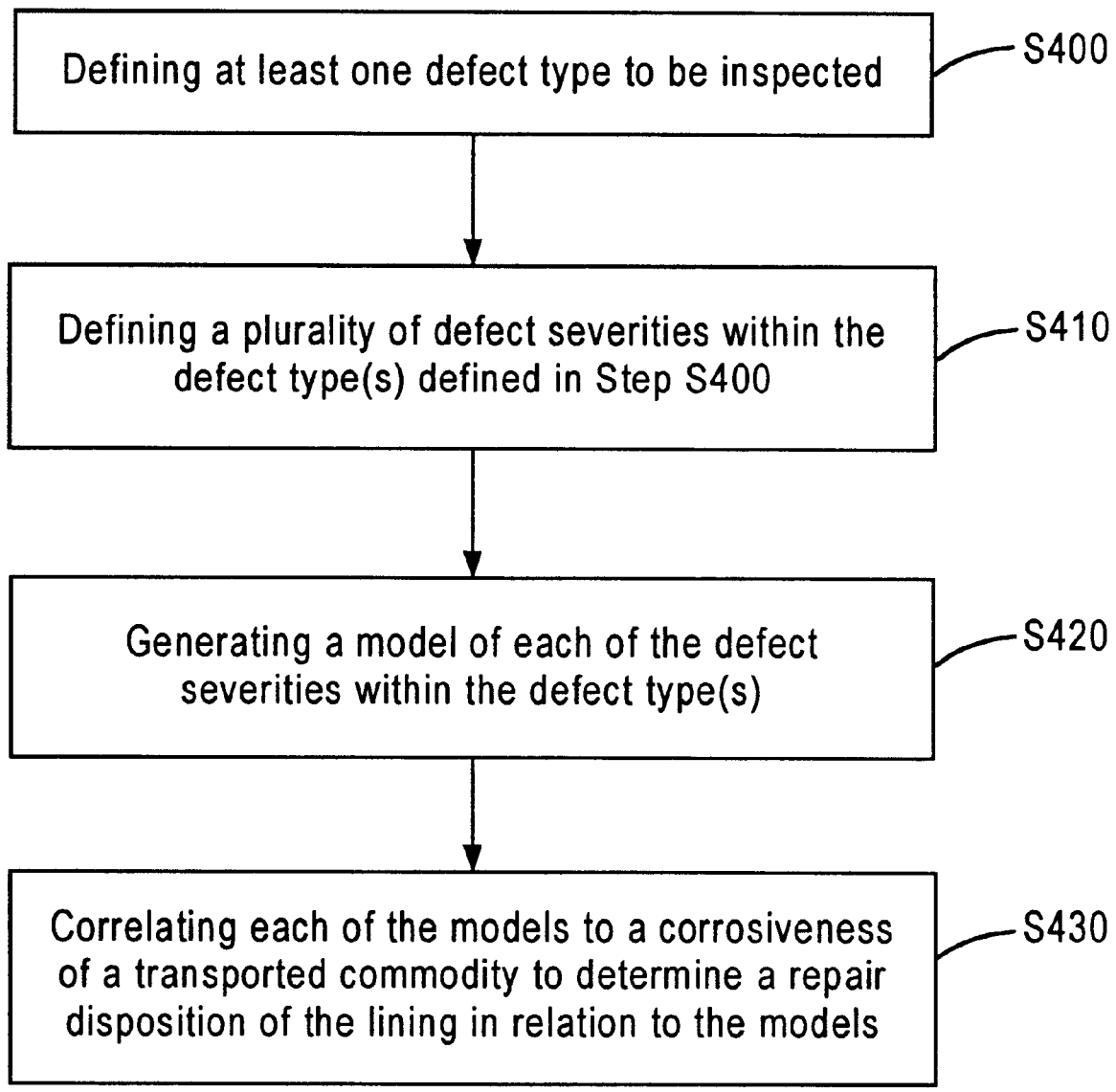
FIG. 4 is a flowchart illustrating a method of standardizing a test procedure in accord with the invention.

With such defect conditions in mind, a method of standardizing a test procedure for inspecting a vessel adapted to contain commodities can be developed as depicted in FIG. 4. This method of standardizing a test procedure includes, in step 400, defining at least one defect type to be inspected, such as a crack inspection. Generally, it is preferred to select for inspection more than one defect type including, for example, cracks, blisters, and corrosion. Subsequently, in step 410 a plurality of defect severities within this defect type, or plurality of defect types, are defined, establishing a scale by which an observed defect severity may be measured and, in step 420, this plurality of defined defect severities are generated into a model of each of the defect severities within each defect type. FIGS. 8–10 illustrate models of blistering, cracking, and corrosion, respectively. These models may be, for example, physical 3-D models, 2-D graphical models, or even electronic models compatible for use, for example with image recognition systems or electronic displays. In a preferred form, these models are graphical models or 2-D pictures included in and printed on a written procedure used by the inspector during inspection of the lining. Exemplary 2-D graphical models are illustrated in FIGS. 8–10, illustrating models used to determine the degree of blistering, cracking and corrosion.

As shown in FIG. 8, the blistering defect type is divided into five severity levels or degrees of size 800 ranging from Number 10 (no blistering), Number 8 (smallest blister easily seen by eye), Number 6 (small blistering), Number 4 (medium blistering), and Number 2 (large blistering). Although the Number 10 condition is not depicted, the remaining defect severities are represented by reference numerals 810, 820, 830, and 840, respectively, depicting standardized models for each of these blistering severities. These models largely eliminate ambiguity as to how to appropriately characterize a particular defect type and severity. Additionally, provision is made for a frequency determination to describe the density of the number of blisters formed in a local area. Preferred codes are MD(medium dense), M(medium), and F(few), as represented by reference numerals 850, 860, 870, respectively, which depict standardized models for each of these densities. The F category 870 represents a situation wherein the blisters cover approximately 2.5% of the total area of a section of predetermined size surrounding the defect, such as an 8"×8" area. This increases to about 15% blister coverage for the M category 860 and increases still further to about 45% blister coverage of the total area for the MD category 850. This combination of defect size and defect density permits inspectors to easily and accurately characterize a defect severity and permits meaningful tracking and trending of the monitored condition.

Similarly in accord with the invention, the defect condition of cracking may be divided into three categories. Code I represents irregular pattern type cracking in which the breaks in the film are in no definite pattern. Code L represents line type cracking in which the breaks in the film are generally arranged in parallel lines, usually horizontally or vertically over the surface. Code S, the third type, represents Sigmoid type cracking in which the breaks in the film form a pattern consisting of curves meeting and intersecting usually on a large scale. Varying densities or severities of the Code S cracking 900 are depicted in four categories in FIG. 9, ranging from a Number 8 (reference numeral 910), Number 6 (reference numeral 920), Number 4 (reference numeral 930), and Number 2 (reference numeral 940).

FIG. 10 further shows the defect condition of corrosiveness divided into four categories 1000 including Re1

(smallest corrosion easily seen by eye), Re2 (small amounts of corrosion), Re3 (medium amounts of corrosion), and Re4 (large amounts of corrosion), respectively represented by reference numerals 1010, 1020, 1030, and 1040.

It bears emphasis that the 2-D graphical models discussed above with reference to FIGS. 8–10 are merely illustrative of models which may be developed and are not limiting to either the number of severities that may be defined for a particular defect type, nor are the defect types confined to those depicted.

Step 430 of the invention includes correlating each of the above noted models for one or more selected defect types to a corrosiveness of a transported commodity to determine a repair disposition of the lining in relation to the models. FIG. 6a represents, in a matrix form, this correlation of models for several selected defect types to a corrosiveness of a transported commodity to determine a repair disposition of the lining in relation to the models. The defect types 600 are provided at the left side of the matrix and are divided into cracks, blisters, and corrosion. These defect types are further subdivided into defect conditions or severities 610 illustrated in FIGS. 8–10. Along the top of the matrix is category "P.P." 620 for "product purity". Product purity represents linings for product purity and is assigned to products which require an exacting degree of lining integrity, including commodities such as food grade material and the like, wherein contact with the metal of the container can induce contamination and lower or ruin the commercial value thereof. Accordingly, in the event that the product is assigned a so-called P.P. rating, even the slightest deterioration raises the risk of contamination and the matrix correspondingly mandates repair as indicated by "R".

Commodity corrosiveness is divided into a plurality of categories 630. As shown in FIG. 6a, four categories are shown ranging in severity between a category 6, the most severe corrosiveness, to a category 2, which possesses minimal corrosiveness, typically less than 0.0025 thousands of an inch per year. In the case of a highly aggressive (viz., corrosive) commodity, such as hydrochloric acid (arbitrary assigned a value of 6), the presence of any cracks sufficient to achieve even the minimum rating, mandates repair (designated by the letter R) in that damage to the tank will occur once the material has passed through the cracks and reached the underlying substrate, such as carbon steel. On the other hand, in the case of a less aggressive material such as vegetable oil (which is not corrosive to skin for example but which does in fact have an interaction with metals) can be assigned a lower value or index such as 2. Thus, as shown in FIG. 6a, even though the condition of the liner used in combination with a commodity having a commodity corrosiveness rating of 2 may be found to have deteriorated from the last inspection from a crack rating of 8(shown as numeral 910 in FIG. 9) to a crack rating of 6 (shown as numeral 920 in FIG. 9), the need for repair is not indicated as being necessary, wherein "A" indicates an accept as is disposition. However, if the crack rating had deteriorated to a Number 4 condition, as shown by numeral 930 in FIG. 9, the matrix would indicate repair, "R", was necessary. In this or a like manner, therefore, each of a plurality of defect types are correlated to a corrosiveness of a transported commodity to determine a repair disposition of the lining in relation to the aforementioned models.

In view of the above, the theoretical life of each lining is based on it's use with an appropriate commodity. Linings (or coatings) may also be assigned a scaled value indicative of the lining's chemical resistance rating, wherein 6 is highly chemical resistant, 5 is moderately chemical resistant, and so on to 2, which is not chemical resistant. FIG. 6b shows lining operating characteristics for a variety of commonly used linings. The estimated life is based on immersion of the lining in the most aggressive chemicals considered acceptable for use with the lining and thus represent a lower end of the life expectancy. As shown in FIG. 6b, the lining materials may be used for wide varieties of commodities, but are generally better suited for particular types or families of commodities than they are for other types of commodities. For example, (unmodified) high bake phenolic (400° F.) is resistant against most solvents and concentrated acids, but is less suitable for strong alkalis, whereas (modified) high bake phenolic (400° F.) has good resistance against strong alkalis, but not against strong acids. Similarly, salt is known to be very corrosive to steel, but it is not particularly aggressive toward coatings.

Thus, the life cycle of the lining may vary significantly depending of the actual commodity carried. Many cars, in fact, carry commodities that are less aggressive than the ones that were carried when the lining was originally applied. Therefore, it can be assumed that the theoretical life of the lining can be extended based on use in less aggressive service. The life cycle multiplier (LCM) is a factor based on the chemical resistance rating of the lining divided by the corrosive rating of the commodity. Similarly, an "extended" lining age or cycle (ELC) can be computed by multiplying the theoretical lining age by the LCM. Generally, if the LCM is less than unity the lining is considered incompatible with the commodity and should be replaced.

Thus, if a commodity with a corrosiveness rating of 6 is paired with an unsuitable lining having a chemical resistance rating of 4, the LCM is 0.667. For a lining with a normal estimated life of 8 years would be reduced to a life-cycle or ELC of about 5 years. If, however, a commodity with a corrosiveness rating of 2 was paired with the same lining, the ELC would be about 16 years, based purely upon considerations of chemical resistance and corrosiveness. It is possible for a lining to last even longer. Realistically, however, the theoretical life is rarely realized due to the action of numerous other factors including mechanical damage, such as but not limited to cracking, denting, abrasion, and vibration.

FIG. 7 shows the lining conditions at the time of inspection in relation to both the ELC and the lining condition. FIG. 7 uses the above models for various defect types and defect severities to associate a lining condition to an ELC and to one of a plurality of distinct combinations of models of one defect type and severity with models of another defect type and severity. In other words, as shown in FIG. 7, the matrix data fields include combinations of defect types and severities 700 and provides, for any pairing of commodity and lining, a normalized ELC-based assignment of a lining condition based on observed defect data. In one such representative data field 710, a lining is rated excellent if, after completing 50% of its complete extended life cycle, there are no cracks, no corrosion, no staining or discoloration. Blisters of a Number 6 size (or smaller) with a 2.5% density (Few rating) are permitted. Also, a DFT reading of greater than 6 mils is required. The DFT reading represents, in a preferred aspect, an average of all of the readings or an average of all except the lowest and highest readings. Other data fields are similarly assigned combinations of defect types and severities representing, in the aggregate, and in combination with liner extended life cycle data, distinct lining conditions.

The above method of standardization provides a method for testing the tank car lining in accord with 49 C.F.R §180.509. As noted previously, the lining or coating installed on the tank car is inspected according an inspection interval, test technique, and acceptance criteria established by the owner of the lining or coating. Prerequisite to any lining inspection, whether conducted in accord with the method of inspection in accord with the invention or in accord with some other method of inspection in compliance with 49 C.F.R §180.509, requires first, determining whether or not a particular tank car possesses a lining or coating for the protection of the tank shell and second, the ownership thereof if the lining inspection is performed by a facility other than the entity owning the tank car lining. If the lining is owned by an entity different from the entity performing the inspection and the owner has inspection procedures for the performance of the inspection, such procedures are obtained from the owner of the lining and the inspection of the liner is carried out accord with the owner's requirements in accord with 49 C.F.R §180.509. The owner may, naturally, opt to adopt or request the inspection to be performed in accord with the method provided herein as discussed below.

Figure 5:
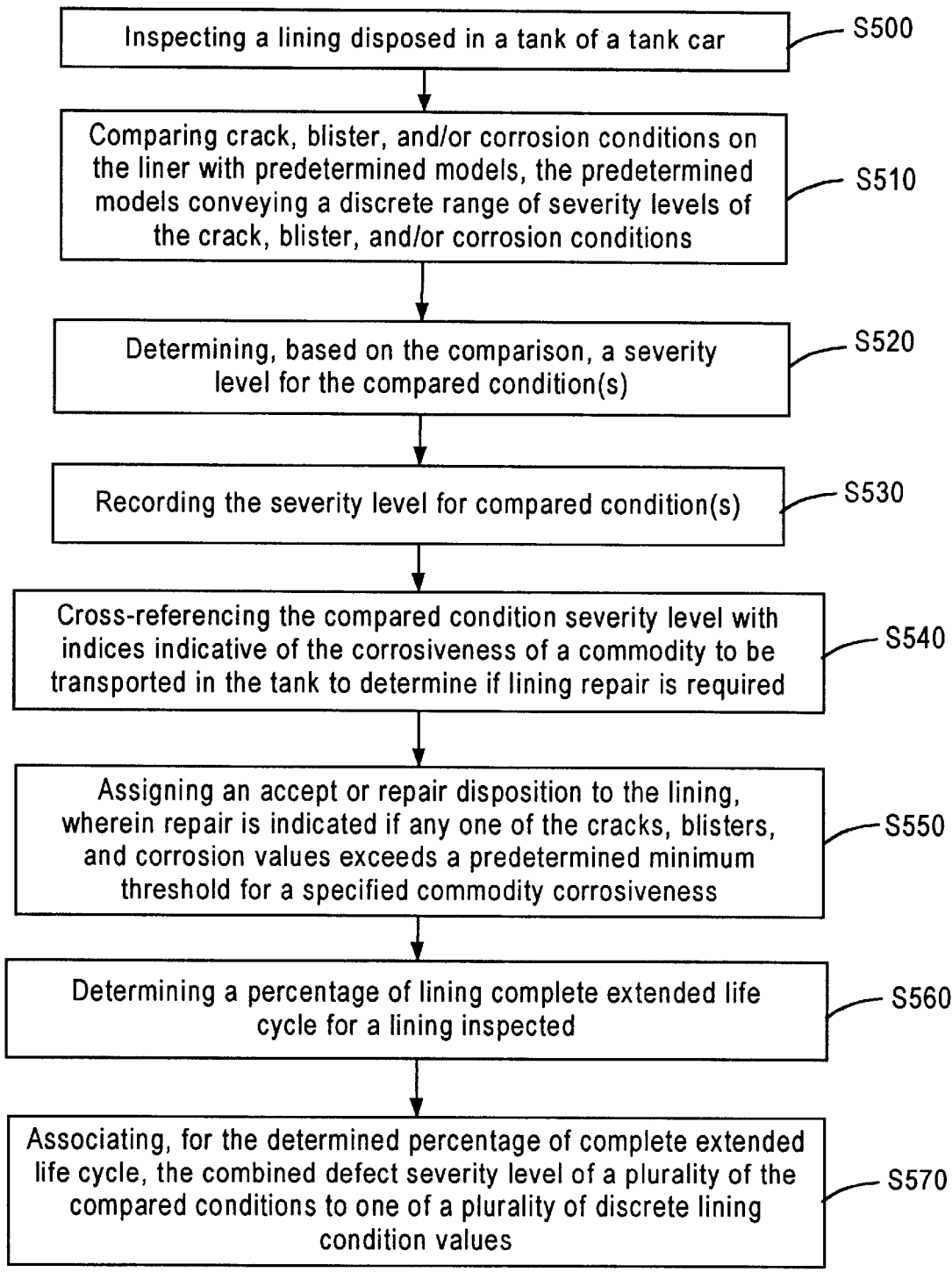
FIG. 5 is a flowchart illustrating a method of inspection in accord with the invention.

The test procedure for inspecting a vehicle adapted to transport commodities in accord with the invention is depicted in FIG. 5. In step 500, the tank car lining is inspected. Step 500 may include inspection for staining or discoloration of the lining or coated surface. All surfaces are visually inspected for signs of contrast in color. If such discoloration is observed, the inspector must use a cleaning solution such as a solution of 1% hydrochloric acid diluted in water in combination with a light colored, preferably white, cloth to determine whether or not the cloth is itself discolored by the stain.

Step 500 also includes inspection for any crack, blister, and/or corrosion conditions on the liner, which are measured, evaluated, and recorded as described in subsequent steps.

DFT measurements may be obtained using a calibrated Type 2 magnetic fixed (constant pressure) probe gauge or like device. Calibration is performed in a manner known to those skilled in the art by placing a plastic or non-magnetic metal shim of a known thickness (i.e., a calibrated shim such as a shim calibrated and traceable to the NIST) closest to the expected or design dry film thickness on a clean metal surface to calibrate the gauge to within +/−1 mil of the known thickness of the shim. To measure the DFT, the gauge probe is placed on the coated surface and a thickness reading in mils is obtained and recorded. Starting at one end of the tank car, such at the B end, and stopping at the opposite end (i.e., the A end), measurements are taken at a predetermined plurality of positions, preferably including at least five measurement positions at each of the A-end head and the B-end head and are spaced apart at approximately the 3:00, 6:00, 9:00, and 12:00 o'clock positions as well as the end head center positions. It is also preferred to obtain readings at a plurality of equally spaced sections of the tank car lining (e.g., rings) between the A-end head and the B-end head, such as the circumferential butt-welds, at approximately the 3:00, 6:00,9:00, and 12:00 o'clock positions.

In step 510, any crack, blister, and/or corrosion conditions observed on the liner during step 500 are compared in step 510 to the predetermined models, as noted above, wherein the predetermined models convey to the user of the procedure a discrete range of severity levels of the crack, blister, and/or corrosion conditions. The;user then determines in step 520, based on the above comparison, a severity level for the compared condition(s) and records, in step 530, the severity level for the compared condition(s).

This test procedure may further include in step 540, cross-referencing the compared condition severity level with indices indicative of the corrosiveness of a commodity to be transported in the tank to determine if lining repair is required. Thus, one of an accept or repair disposition may be assigned to the lining in step 550 if any one of the indices cracks, blisters, and corrosion conditions exceeds a predetermined minimum threshold for a specified commodity corrosiveness. For reasons discussed above, the method may also include determining if the commodity has a predetermined product purity level and accordingly modifying the repair status to one indicating repair in the event that any one of the cracks, blisters and corrosion effects exceeds a minimum value.

The procedure may also advantageously include determining a percentage of lining complete extended life cycle in step 560 for an inspected lining to permit, in step 570, association of the combined defect severity level of a plurality of the compared conditions to a discrete lining condition value in accord with the percentage of lining complete extended life cycle. In one aspect, this permits, as shown in FIG. 7, an inspector of a lining with a known ELC of 46% observing Number 8 cracks, No. 6 blisters with a 2.5% density, no corrosion, an average DFT of 9 mils, and total staining of 8 square feet would assign a condition rating of "fair" because the crack rating exceeds the tolerance for the "good" rating. Alternatively, since the age of the liner is known, but the accuracy of the ELC calculation itself is an estimated quantity, correlation of the actual lining condition to the predicted percentage of completed ELC permits verification of the ELC calculation. If the inspection results are, for example, consistently excellent for a completed ELC of 83%+ for a given commodity/lining combination, the ELC calculation may be revised to better comport with observed "real-life" data for the commodity/lining pairing. In this way, the collected data permits estimation of the remaining useful life of the liner in the aggregate given a statistically sufficient number of data points.

In various aspects of the above invention, the procedure may set forth that only a location of the most severe of each of the compared conditions is recorded. Alternatively, the procedure may set forth that a location of each of the compared conditions exceeding a minimum threshold is recorded. Still further, the procedure may integrate approximate total surface areas covered by affected surfaces. The invention requires only that the liner conditions are compared with predetermined models conveying a discrete range of severity levels of the defect conditions and a severity level therefor is determined.

It is preferred that the combined defect severity level is a combination of cracks, blisters, and corrosion conditions, as well as dry film thickness and discoloration conditions. However, if desired, additional factors could be considered and incorporated into the matrix or index including, for example, a correlation between the type or composition of the lining or coating and the corrosiveness of the commodity to account for potential variances in the rate of defect propagation between different linings used for the same commodity. In this regard, it is desired not only to obtain information specific to an immediate determination of operability over a determined inspection interval, but to obtain and record other data points, such as but not limited to lining type and construction, for trending purposes. Based on trending analysis of the data so obtained, the matrix may be adjusted accordingly in accord with the invention.

Although one preferred aspect of the test procedure for inspecting a vehicle adapted to transport commodities includes hard-copy graphical models on the pages of a procedure used by the inspector, it is within the scope of the present invention to enter or convert this data into an electronically readable format and to compile it in a computer readable database. Although present implemented with an IBM AS400 Legacy system, the invention may be implemented in a variety of platforms and mediums, as discussed below.

Figure 11:
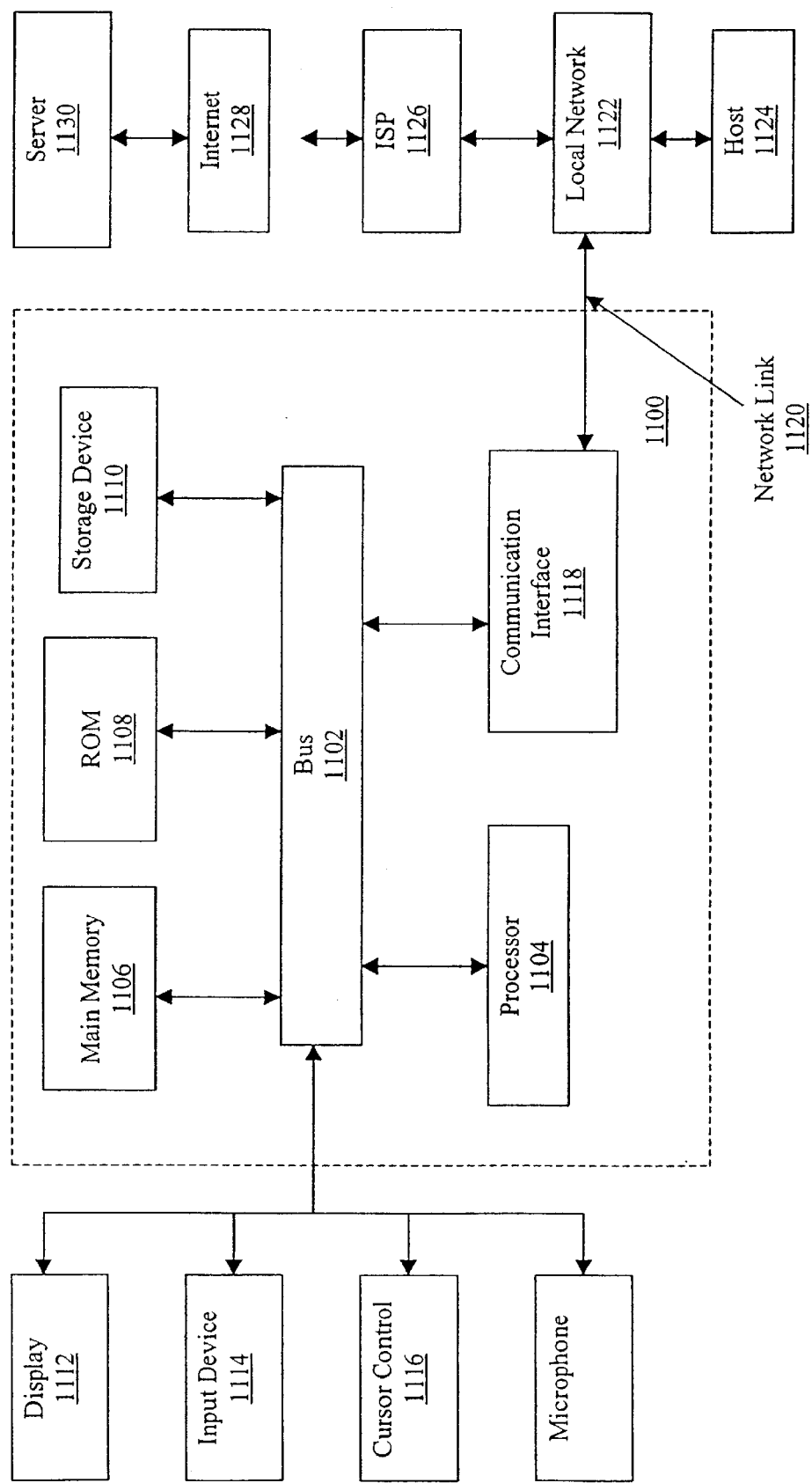
FIG. 11 is a block diagram depicting a computer system upon which an embodiment of the invention may be implemented.

FIG. 11 is a block diagram that illustrates a computer system 1100 upon which embodiments of the invention may be implemented. Computer system 1100 includes a bus 1102 or other communication mechanism for communicating information, and a processor or processors 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions. Computer system 1100 may be coupled via bus 1102 to a display 1112, such as a cathode ray tube (CRT) or may be a handheld active or passive display, for displaying information to a computer user. An input device 114, including alphanumeric and other keys, is coupled to bus 1102 for communicating information and command selections to processor 1104. Another type of user input device is cursor control 116, such as a mouse, a trackball, or cursor direction keys for communicating direction information and command selections to processor 1104 and for controlling cursor movement on display 112. This input device typically has two degrees of freedom in two axes, a first axis (e.g., x) and a second axis (e.g., y), that allows the device to specify positions in a plane.

Execution of sequences of instructions contained in main memory 1106 causes processor 1104 to perform the process steps described herein. One or more processors in a multi-processing arrangement may also be employed to execute the sequences of instructions contained in main memory 106. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 1104 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media. Non-volatile media include, for example, optical or magnetic disks, such as storage device 1110. Volatile media include dynamic memory, such as main memory 1106. Transmission media include coaxial cables, copper wire and fiber optics, including the wires that comprise bus 1102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be borne on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 106, from which processor 1104 retrieves and executes the instructions. Instructions received by main memory 1106 may optionally be stored on storage device 1110 either before or after execution by processor 1104.

Computer system 1100 may also include a communication interface 1118 coupled to bus 1102 to provide a two-way data communication coupling to a network link 1120 connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network, now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information. Thus the processing required by method of the invention described by way of example herein may be implemented on a local computer utilizing storage device 1110 or may be implemented, for example, on a LAN or over the internet.

Computer system 1100 can send messages and receive data, including program code, through the network(s), network link 1120, and communication interface 1118. In the Internet example, a server 1130 might transmit a requested code for an application program through Internet 1128, ISP 1126, local network 1122 and communication interface 1118. In accordance with the invention, one such downloaded application provides for transmitting an inspection procedure to an inspector at a remote inspection data from a remote location to a central computer. The received code may be executed by processor 1104 as it is received, and/or stored in storage device 1110, or other non-volatile storage for later execution. In this manner, computer system 1100 may obtain application code in the form of a carrier wave.

While the invention has been described with reference to only a few facets thereof, it is submitted that, when in possession of the documentation which is contained in the Appendices of this application, and given the guidance/knowledge of the preceding disclosure, that a person of skill in the art to which the instant invention pertains, would be fully enabled and would be able to implement and practice the claimed invention without difficulty.

What is claimed:

1. A test procedure for inspecting a vehicle adapted to transport commodities, comprising the steps of:

inspecting a lining disposed in a tank of a tank car;

comparing at least one prescribed defect condition on the liner with predetermined models, said predetermined models conveying a discrete range of severity levels of said at least one prescribed defect condition;

determining, based on the comparison, a severity level for the at least one prescribed defect condition;

recording the severity level for the at least one prescribed defect condition;

cross-referencing the prescribed defect condition severity level with indices indicative of the corrosiveness of a commodity to be transported in the tank to determine if lining repair is required prior to a next scheduled lining inspection; and assigning one of an accept or repair disposition to the lining if any one of prescribed defect conditions exceed a predetermined minimum threshold for a specified commodity corrosiveness.

2. A test procedure as set forth in claim 1, further comprising the steps of:

determining if the commodity has a predetermined product purity level;

modifying the repair status to one indicating repair in the event that the commodity has a predetermined product purity level and any one of the prescribed defect conditions exceeds a minimum threshold value.

3. A test procedure for inspecting a vehicle adapted to transport commodities, comprising the steps of:

inspecting a lining disposed in a tank of a tank car;

comparing at least one prescribed defect condition on the liner with predetermined models, said predetermined models conveying a discrete range of severity levels of said at least one prescribed defect condition;

determining, based on the comparison, a severity level for the at least one prescribed defect condition;

recording the severity level for the at least one prescribed defect condition;

determining a percentage of lining complete extended life cycle for a lining inspected; and associating, for the determined percentage of complete extended life cycle, the combined defect severity levels of a plurality of said prescribed defect conditions to one of a plurality of discrete lining condition values.

4. A test procedure as set forth in claim 3, wherein said plurality of said prescribed defect conditions comprise at least one of cracks, blisters, and corrosion conditions.

5. A test procedure as set forth in claim 4, wherein said plurality of said prescribed defect conditions comprise at least one of dry film thickness and discoloration conditions.

6. A test procedure as set forth in claim 5, wherein a location of the most severe of each of said plurality of said prescribed defect conditions is recorded.

7. A test procedure as set forth in claim 5, wherein a location of each of said plurality of said prescribed defect conditions exceeding a minimum threshold is recorded.

8. A method of standardizing a test procedure for inspecting a vessel adapted to contain commodities, comprising the steps of:

defining at least one defect type;

defining a plurality of defect severity's within said at least one defect type; and generating a pattern or graphical model of each of said defect severity's within said at least one defect type;

correlating each pattern or graphical model to a corrosiveness of a transported commodity to determine a repair disposition of the lining in relation to said pattern or graphical model to determine if lining repair is required prior to a next scheduled lining inspection.

9. A method of standardizing a test procedure for inspecting a vessel adapted to contain commodities according to claim 8, further comprising the steps of:

defining a plurality of defect types including at least one member selected from the group of cracks, blisters, corrosion, dry film thickness, and discoloration.

10. A method of standardizing a test procedure for inspecting a vessel adapted to contain commodities according to claim, wherein at least one pattern or graphical model comprises a physical model or electronic model.

11. A method of standardizing a test procedure for inspecting a vessel adapted to contain commodities, comprising the steps of:

defining at least one defect type;

defining a plurality of defect severities within said at least one defect type; and generating a model of each of said defect severities within said at least one defect type;

correlating a lining condition to one of a plurality of distinct combinations of models of one defect type and severity with models of another defect type and severity.

12. A method of standardizing a test procedure for inspecting a vessel adapted to contain commodities according to claim 11, wherein said correlation step further comprises relating said plurality of distinct combinations of models of one defect type and severity with models of another defect type and severity to a percentage of liner completed extended life cycle.

13. A method of standardizing a test procedure for inspecting a vessel adapted to contain commodities according to claim 12, further comprising the steps of:

defining a plurality of defect types including at least one member selected from the group of cracks, blisters, corrosion, dry film thickness, and discoloration.

14. A method of standardizing a test procedure for inspecting a vessel adapted to contain commodities according to claim 13, wherein said models comprise at least one of physical models, graphical models, and electronic models.

15. A computer-readable medium bearing instructions enabling a computer having at least one processor to facilitate inspection of a vessel adapted to contain commodities, the instructions, when executed by a computer, causing the computer to carry out the steps of:

prompting for selection of one of a plurality of indicated defect types;

displaying a plurality of patterns or graphical models of the selected defect type, said plurality of patterns or graphical models defining a corresponding plurality of defect severity levels;

prompting for selection of one of said patterns or graphical models substantially corresponding to an inspection result;

performing at least one of storing the selected pattern or graphical model and defect type and outputting a signal corresponding to the selected pattern or graphical model and defect type; and comparing the selected pattern or graphical model to a stored index of acceptance criteria values for the corresponding defect type, said acceptance criteria values relating to at least one of a commodity integrity, a vessel lining integrity, and a vessel integrity, over a predetermined periodic inspection interval.

16. A computer-readable medium bearing instructions enabling a computer having at least one processor to facilitate inspection of a vessel adapted to contain commodities, the instructions, when executed by a computer, in accord with claim 15, comprising:

comparing the output signal to a corrosiveness of a transported commodity to determine a repair disposition of the vessel lining in relation to a predetermined relationship between said plurality of patterns or graphical models and a plurality of commodity corrosiveness values to determine if lining repair is required prior to a next scheduled lining inspection.

* * * * *